United States Patent
Miao et al.

(10) Patent No.: US 11,861,489 B2
(45) Date of Patent: Jan. 2, 2024

(54) CONVOLUTIONAL NEURAL NETWORK ON-CHIP LEARNING SYSTEM BASED ON NON-VOLATILE MEMORY

(71) Applicant: HUAZHONG UNIVERSITY OF SCIENCE AND TECHNOLOGY, Hubei (CN)

(72) Inventors: Xiangshui Miao, Hubei (CN); Yi Li, Hubei (CN); Wenqian Pan, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 840 days.

(21) Appl. No.: 16/961,932

(22) PCT Filed: Jul. 12, 2019

(86) PCT No.: PCT/CN2019/095680
§ 371 (c)(1),
(2) Date: Jul. 14, 2020

(87) PCT Pub. No.: WO2020/052342
PCT Pub. Date: Mar. 19, 2020

(65) Prior Publication Data
US 2020/0342301 A1    Oct. 29, 2020

(30) Foreign Application Priority Data
Sep. 11, 2018    (CN) .......................... 201811058657.8

(51) Int. Cl.
*G06N 3/065* (2023.01)
*G06N 3/04* (2023.01)
(Continued)

(52) U.S. Cl.
CPC .......... *G06N 3/065* (2023.01); *G06F 17/153* (2013.01); *G06N 3/04* (2013.01); *G06N 3/08* (2013.01)

(58) Field of Classification Search
CPC ......... G06F 17/153; G06F 17/16; G06N 3/04; G06N 3/08; G06N 3/084; G06N 3/0454;
(Continued)

(56) References Cited

U.S. PATENT DOCUMENTS

| 10,740,671 B2 * | 8/2020 | Gokmen .................. G06N 3/04 |
| 2017/0200078 A1 * | 7/2017 | Bichler .................. G06N 3/045 |

(Continued)

FOREIGN PATENT DOCUMENTS

| CN | 107742153 | 2/2018 |
| CN | 108182471 | 6/2018 |
| CN | 109460817 | 3/2019 |

OTHER PUBLICATIONS

Garbin, Daniele, et al. "Variability-tolerant convolutional neural network for pattern recognition applications based on OxRAM synapses." 2014 IEEE international electron devices meeting. IEEE, 2014: 28.4.1-28.4.4 (Year: 2014).*

(Continued)

*Primary Examiner* — Kamran Afshar
*Assistant Examiner* — Randall K. Baldwin
(74) *Attorney, Agent, or Firm* — JCIP GLOBAL INC.

(57) ABSTRACT

Disclosed by the disclosure is a convolutional neural network on-chip learning system based on non-volatile memory, comprising: an input module, a convolutional neural network module, an output module and a weight update module. The on-chip learning of the convolutional neural network module implements the synaptic function by using the characteristic of the memristor, and the convolutional kernel value or synaptic weight value is stored in a
(Continued)

memristor unit; the input module converts the input signal into the voltage signal; the convolutional neural network module converts the input voltage signal layer-by-layer, and transmits the result to the output module to obtain the output of the network; and the weight update module adjusts the conductance value of the memristor in the convolutional neural network module according to the result of the output module to update the network convolutional kernel value or synaptic weight value.

5 Claims, 6 Drawing Sheets

(51) Int. Cl.
*G06N 3/08* (2023.01)
*G06F 17/15* (2006.01)
(58) Field of Classification Search
CPC ...... G06N 3/0481; G06N 3/049; G06N 3/063; G06N 3/0635
See application file for complete search history.

(56) References Cited

U.S. PATENT DOCUMENTS

| | | | |
|---|---|---|---|
| 2018/0018559 A1* | 1/2018 | Yakopcic | G06N 3/045 |
| 2018/0114572 A1* | 4/2018 | Gokmen | G06N 3/084 |
| 2021/0019609 A1* | 1/2021 | Strukov | G11C 16/14 |

OTHER PUBLICATIONS

Yakopcic, Chris, Md Zahangir Alom, and Tarek M. Taha. "Memristor crossbar deep network implementation based on a convolutional neural network." 2016 International joint conference on neural networks (IJCNN). IEEE, 2016: 963-970. (Year: 2016).*

Gokmen, Tayfun, Murat Onen, and Wilfried Haensch. "Training deep convolutional neural networks with resistive cross-point devices." Frontiers in neuroscience 11 (2017): 538: 1-13 (Year: 2017).*

Negrov, D., et al. "An approximate backpropagation learning rule for memristor based neural networks using synaptic plasticity." Neurocomputing 237 (2017): 193-199. (Year: 2017).*

Lu, Darsen D., et al. "NVMLearn: a simulation platform for non-volatile-memory-based deep learning hardware." 2017 International Conference on Applied System Innovation (ICASI). IEEE, 2017: 66-69 (Year: 2017).*

Nair, Manu V., Lorenz K. Muller, and Giacomo Indiveri. "A differential memristive synapse circuit for on-line learning in neuromorphic computing systems." Nano Futures 1.3 (2017): 035003: 1-12 (Year: 2017).*

Sun, Shengyang, et al. "Low-consumption neuromorphic memristor architecture based on convolutional neural networks." 2018 International Joint Conference on Neural Networks (IJCNN). IEEE, Jul. 2018. (Year: 2018).*

Krestinskaya, Olga, Khaled Nabil Salama, and Alex Pappachen James. "Learning in Memristive Neural Network Architectures using Analog Backpropagation Circuits." arXiv preprint arXiv:1808.10631 (Aug. 2018): 1-14 (Year: 2018).*

Zhang, Yang, et al. "Synaptic characteristics of Ag/AgInSbTe/Ta-based memristor for pattern recognition applications." IEEE Transactions on Electron Devices 64.4 (2017): 1806-1811. (Year: 2017).*

Vianello, Elisa, et al. "Resistive memories for spike-based neuromorphic circuits." 2017 IEEE International Memory Workshop (IMW). IEEE, 2017. (Year: 2017).*

"International Search Report (Form PCT/ISA/210) of PCT/CN2019/095680", dated Sep. 29, 2019, with English translation thereof, pp. 1-4.

Hu Fei, et al., "Circuit Design of Convolutional Neural Network Based on Memristor Crossbar Arrays," Journal of Computer Research and Development, May 2018, pp. 1097-1107.

* cited by examiner $$\begin{bmatrix} -0.2 & 0.4 \\ -0.7 & 0.6 \end{bmatrix} \Rightarrow \begin{bmatrix} 0.6 & 0 & 0 & 0 \\ 0.4 & 0.6 & 0 & 0 \\ 0 & 0.4 & 0 & 0 \\ 0 & 0 & 0.6 & 0 \\ 0 & 0 & 0.4 & 0.6 \\ 0 & 0 & 0 & 0.4 \\ 0 & 0 & 0 & 0 \\ 0 & 0 & 0 & 0 \\ 0 & 0 & 0 & 0 \end{bmatrix} \begin{bmatrix} 0 & 0 & 0 & 0 \\ 0 & 0 & 0 & 0 \\ 0 & 0 & 0 & 0 \\ 0.7 & 0 & 0 & 0 \\ 0.2 & 0.7 & 0 & 0 \\ 0 & 0.2 & 0 & 0 \\ 0 & 0 & 0.7 & 0 \\ 0 & 0 & 0.2 & 0.7 \\ 0 & 0 & 0 & 0.2 \end{bmatrix}$$

$$\begin{bmatrix} x_1 & x_2 & x_3 \\ x_4 & x_5 & x_6 \\ x_7 & x_8 & x_9 \end{bmatrix} \Rightarrow \begin{bmatrix} x_1 \\ x_2 \\ x_3 \\ x_4 \\ x_5 \\ x_6 \\ x_7 \\ x_8 \\ x_9 \end{bmatrix} \begin{bmatrix} -x_1 \\ -x_2 \\ -x_3 \\ -x_4 \\ -x_5 \\ -x_6 \\ -x_7 \\ -x_8 \\ -x_9 \end{bmatrix}$$

$$W \begin{bmatrix} 0.1 & -0.5 & 0.8 \\ -0.9 & -0.6 & 0.5 \\ -0.4 & 0.3 & 0.2 \end{bmatrix} \Rightarrow \begin{matrix} [0.1 \quad 0 \quad 0.8 \quad 0 \quad 0 \quad 0.5 \quad 0 \quad 0.3 \quad 0.2] & W+ \\ \\ [0 \quad 0.5 \quad 0 \quad 0.9 \quad 0.6 \quad 0 \quad 0.4 \quad 0 \quad 0] & W- \end{matrix}$$

CONVOLUTIONAL NEURAL NETWORK ON-CHIP LEARNING SYSTEM BASED ON NON-VOLATILE MEMORY

CROSS-REFERENCE TO RELATED APPLICATION

This application is a 371 of international application of PCT application serial no. PCT/CN2019/095680, filed on Jul. 12, 2019, which claims the priority benefit of China application no. 201811058657.8, filed on Sep. 11, 2018. The entirety of each of the above mentioned patent applications is hereby incorporated by reference herein and made a part of this specification.

BACKGROUND

Technical Field

The disclosure relates to the technical field of artificial neural networks, and more particularly, to a convolutional neural network on-chip learning system based on non-volatile memory.

Description of Related Art

Artificial neural network is a structure which applies similar structure to the synaptic connections in the brain, which is a mathematical model that imitates the behavioral characteristics of neural networks of animals for performing information processing, and a mathematical algorithm model that performs dispersed and parallel information processing. Among many machine learning algorithms, neural networks have wide applicability and strong robustness. The complexity of such kind of system which is operated based on network resulted from adjusting interconnections between a large number of internal nodes to further process information.

As one of the most important algorithms for deep learning, convolutional neural networks have great advantages in large-scale image recognition. Convolutional Neural Network (CNN)-based structure composed of multiple convolutional layers and pooling layers can extract useful feature information without an extensive manual input of data, which allows such a structure to have high accuracy in various pattern recognition applications. Therefore, it is a promising task to implement such a structure in hardware. Most of the existing tasks are carried out based on CPU and GPU, which causes great power consumption, that is, the so-called Von Neumann bottleneck. Therefore, there is an urgent need to find a new type of memory device that simulates the human brain, while achieving information storage and processing. CNN utilizes the spatial structure of the input image, which makes it more suitable for visual tasks than other neural network structures such as fully connected neural networks. The biggest challenge so far is to integrate CNN into embedded systems. To implement in hardware, synapses are the most processing elements in neural networks. In terms of synaptic devices, many devices have been proposed such as magnetic memory, phase change memory, and memristors. Among them, since the memristor is characterized in non-volatile, easy to integrate, low power consumption and can realize multi-bit storage, it is a very promising option. The analog memory function of memristor is similar to that of biological synapses, of which the conductance can be continuously changed by applying a relatively large voltage bias, but it remains unchanged when a relatively small or no bias is applied. Memristors can be integrated through a crossbar structure, and the use of which can achieve synaptic density more relevant or greater than that of brain tissue. CNNs based on memristors can adopt neural circuits and auxiliary circuits that are easy to be implemented, while simultaneously reducing power consumption, performing calculations at a higher speed and achieving parallelism physically.

SUMMARY

Technical Problem

In view of the shortcomings of the existing technology, the purpose of the disclosure is to solve the Von Neumann bottleneck encountered by existing computers to implement convolutional neural networks. The separation of calculation and storage is quite time-consuming and slow, and the hardware costs a lot. Moreover, computer-assisted off-chip learning can only achieve specific functions that are pre-trained, and cannot solve technical problems in a timely and flexible manner.

To achieve the above purpose, the disclosure provides a convolutional neural network on-chip learning system based on non-volatile memory, including an input module, a convolutional neural network module, an output module, and a weight update module.

The input module converts the input signal into the input voltage pulse signal required by the convolutional neural network module, and then transmit the input voltage pulse signal into the convolutional neural network module.

The input voltage pulse signal corresponding to the input signal is processed through the layer-by-layer calculation and conversion performed by the convolutional neural network module to complete the on-chip learning to obtain the output signal, the on-chip learning implements a synaptic function by using the conductance modulation characteristic that the conductance of the memristor changes according to the applied pulse. The network convolution kernel values or synaptic weight values adopted in the on-chip learning process are stored in the memristor.

The output module converts and sends the output signal generated by the convolutional neural network module to the weight update module.

The weight update module calculates the error signal and adjusts the conductance value of the memristor according to the result of the output module, so as to update the network convolution kernel value or the synaptic weight value.

Optionally, the input module converts an external input signal into the input voltage pulse signal required by the convolutional neural network, the pulse width or pulse amplitude of the input signal and the input voltage pulse signal follow a proportional relationship, and the input voltage pulse signal should be less than the erase voltage of the memristor.

Optionally, the convolutional neural network module adopts the memristor to simulate the network convolution kernel value and the synaptic weight value, and the resistance of the memristor changes according to the applied electrical signal.

The convolutional neural network module comprises a convolution layer circuit unit, a pooling layer circuit unit, and a fully connected layer circuit unit. The convolution layer circuit unit and the pooling layer circuit unit are composed by using the memristor array as convolution kernels, and the fully connected layer circuit unit is composed by using the memristor array as synapses.

The convolutional layer circuit unit receives the input voltage pulse signal output by the input module, and the input voltage pulse signal is processed through the layer-by-layer calculation and conversion performed by the convolutional layer circuit unit, the pooling layer circuit unit, and the fully connected layer circuit unit, and the calculation result is transmitted to the output module as an output signal.

Optionally, the convolutional layer circuit unit is composed of a convolution operation circuit and an activation function part, the convolution operation circuit is formed by the memristor array.

The convolution operation circuit adopts two rows of memristor arrays as a convolution kernel to realize positive and negative convolution kernel values. When the initial convolution kernel value corresponds to the memristor conductance value, the convolution kernel value is mapped to a matrix capable of performing a matrix multiplication operation with the entire input signal, and the convolution kernel is expanded into two large sparse matrices K+ and K−, which are respectively positive and negative convolution kernel values corresponding to a neuron node. Correspondingly, the characteristic that the memristor is capable of being applied with positive and negative read voltage pulses is utilized to convert the input signal into two one-dimensional matrices with positive input X and negative input −X.

The convolution operation circuit performs a convolution operation on the input voltage pulse signal and the convolution kernel value stored in a memristor unit, and collects currents of the same column to obtain a convolution operation result. The convolution operation process is y=f((X⊗K+)±(−X⊗K−)+b), wherein y is a result of the convolution operation, ⊗ is a convolution operator, X is an input voltage signal of a front synapse of the neuron node, K+ and K− are respectively the positive and negative convolution kernel values corresponding to the neuron node, b is an bias term corresponding to the convolutional layer network, and f(.) is the activation function.

The convolutional layer circuit unit transmits the convolution operation result to the pooling layer circuit unit.

The activation function activates the convolution operation result and obtains two opposite output values, y and −y, and simultaneously converts the two opposite output values y and −y into a voltage pulse signal to serve as the input of the pooling layer circuit unit.

Optionally, the pooling layer circuit unit is divided into the average pooling operation and the maximum pooling operation, which are composed of a pooling operation circuit composed of the memristor array and a voltage conversion sub-unit.

The network convolution kernel value stored in the memristor array corresponding to the pooling operation circuit remains unchanged during the training process. Circuit structure of the pooling operation circuit and mapping distribution of the convolution kernel are the same as the convolutional layer circuit unit, only the stored convolution kernel value is changed.

The voltage conversion sub-unit converts the result of the pooling operation circuit into two opposite voltage pulse signals, h and −h, so as to serve as the input of the fully connected layer circuit unit.

Optionally, the fully connected layer circuit unit realizes a classification function, and is composed of the fully connected layer circuit composed of the memristor array and a softmax function part, the weight mapping methods of the fully connected layer circuit unit and the convolutional layer circuit unit are different.

The fully connected layer circuit is configured to store and calculate the weight matrix, only completes a series of multiplication accumulation operations without shifting the weight matrix, two memristors are utilized as a synapse to realize positive and negative weight values. One end of the memristor is connected to the pooling layer circuit unit, and another end is connected to the softmax function, the current of the same column is collected to obtain the output result of the layer, the output result is $m_l=\Sigma_l((W_{kl}^+-W_{kl}^-)*h_k+b_k)$, $$z_l = \frac{e^{m_l}}{\Sigma_j e^{m_j}}.$$

In the equation, $h_k$ is an input voltage pulse signal of a front synapse of the kth neuron node, $W_{kl}^+$ and $W_{kl}^+$ are respectively the positive and negative synaptic weight values of the kth input of the lth neuron node stored in the memristor, and the effective weight value of the synapse is $W_{kl}^+-W_{kl}^-$, thereby realizing positive and negative synaptic weight values, $b_k$ is a bias term corresponding to the kth neuron node; $m_l$ represents an lth element output through the operation of the fully connected layer circuit; $\Sigma_j e^{m_j}$ is the exponential sum of all output signal elements; $z_l$ is the probability output value corresponding to the signal $m_l$ after being processed through the softmax function.

The softmax function realizes $$z_l = \frac{e^{m_l}}{\Sigma_j e^{m_j}},$$

that is, the function of normalizing the values output by the fully connected layer to a probability value, and then the result is transmitted to the output module to obtain the output of the entire convolutional neural network, and the result is sent to the weight update module.

Optionally, the weight update module includes a result comparison unit, a calculation unit, and a driving unit.

The result comparison unit is connected to the output module and the calculation unit respectively, the result comparison unit compares the output result of the current convolutional neural network module with the preset ideal result, and sends the comparison result to the calculation unit.

The calculation unit is connected to the result comparison unit and the driving unit respectively, the calculation unit receives the error signal δ sent from the result comparison unit, and calculates the adjustment amount of the network convolution kernel value or the weight value according to the determined neural network backpropagation algorithm, and then sends the result to the driving unit. The driving unit includes a pulse generator and a read-write circuit, the driving unit receives the adjustment amount of the convolution kernel value or the weight value sent from the calculation unit, and adjusts the conductance of the memristors of the convolutional layer circuit unit and the fully connected layer circuit unit; the pulse generator is configured to generate the modulation signal for adjusting the conductance of the memristor; the read-write circuit completes read and write operations on the convolution kernel value or the synaptic weight value of the convolutional neural network module based on the memristor.

In summary, the above technical solutions conceived by the disclosure have the following advantageous effect compared with the related art.

In the convolutional neural network on-chip learning system based on non-volatile memory provided by the disclosure, the input module receives external information and converts the same into a voltage pulse signal. The signal is processed through the layer-by-layer calculation performed by the convolutional layer, the pooling layer and the fully connected layer in the convolutional neural network module and then transmitted into the output module and sent to the weight update module. The weight update module calculates and adjusts the conductance of the memristor according to the result of the output module to update the network convolution kernel value or the synaptic weight value. The convolutional neural network module simulates continuous adjustment of the convolution kernel value and synaptic weight value by using the multi-stage conductance modulation characteristic that the conductance of the memristor changes according to the applied electrical signal. The convolutional layer and the pooling layer adopt two rows of memristor arrays as a convolution kernel to realize the positive and negative convolution kernel function. The fully connected layer utilizes two memristors as a synapse to realize positive and negative weight values. In the convolutional neural network, the convolution calculation is the most time-consuming. The disclosure utilizes the memristor to implement the convolutional neural network calculation. Such an approach has high degree of parallelism and can greatly improve the operation speed and density of the entire system. The operating energy consumption can be considerably reduced, and the integration of information storage and calculation can be achieved. At the same time, on-chip learning of convolutional neural networks can be achieved. It is possible to realize real-time and low energy simulation of brain-scale neural networks to solve the shortcoming of brain computing structure under the conventional Von Neumann system.

BRIEF DESCRIPTION OF THE DRAWINGS

FIG. 5(a) is a schematic diagram of a mapping formula showing how a convolution kernel matrix K is converted into a matrix K+ and K−; FIG. 5(b) is a schematic diagram of a mapping formula showing how an input matrix X is converted into two one-dimensional matrices X and −X.

DESCRIPTION OF THE EMBODIMENTS

Figure 1:
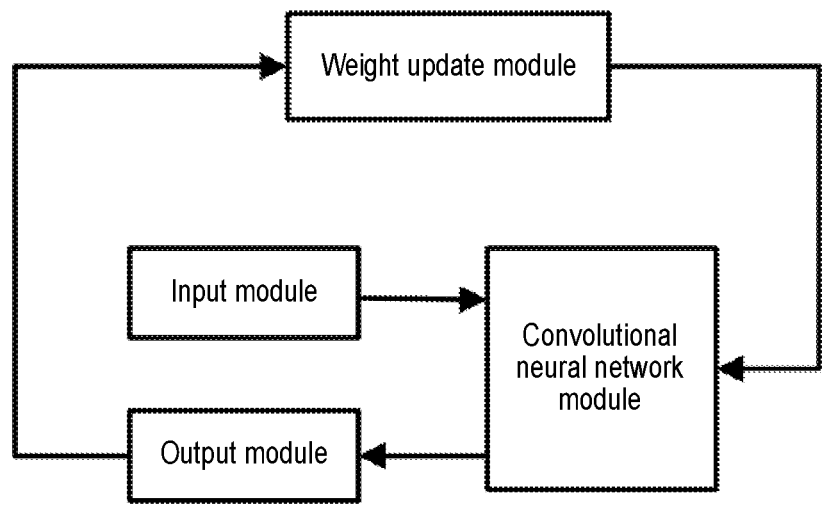
FIG. 1 is a schematic structural diagram of a convolutional neural network on-chip learning system based on non-volatile memory provided by an embodiment of the disclosure.

In order to make purpose, technical solutions and advantages of the disclosure clearer, the disclosure will be further described in detail in combination with the accompanying drawings and embodiments. It should be understood that the specific embodiments described herein are only used to explain the disclosure, and are not intended to limit the disclosure. In addition, the technical features involved in the various embodiments of the disclosure described below can be combined with each other as long as there is no conflict with each other.

The on-chip learning performed by the convolutional neural network not only can overcome the influence of device variability, but also more in line with the learning characteristics in biology. Furthermore, the on-chip learning of convolutional neural network can also modify the weight according to the task to be performed, thus having good flexibility. Therefore, it is necessary to realize the hardware, the integration of storage and calculation, and on-chip learning of the convolutional neural network.

The disclosure provides an on-chip learning system of a convolutional neural network based on non-volatile memory, including: an input module, a convolutional neural network module, an output module, and a weight update module. The on-chip learning of the convolutional neural network module implements a synaptic function by using the characteristic which the conductance of the memristor changes according to the applied pulse, and the convolution kernel value or synaptic weight value is stored in the memristor unit.

The input module converts the input signal into the input voltage pulse signal required by the convolutional neural network, and then transmits the result to the convolutional neural network module; the convolutional neural network module performs a layer-by-layer calculation and conversion on the input voltage pulse signal corresponding to the input signal, and transmits the result to the output module to obtain the output of the entire network; the output module is connected to the convolutional neural network module and the weight update module respectively, and configured to convert and send the output signal generated by the convolutional neural network module to the weight update module; the weight update module calculates and adjusts the conductance of the memristor according to the result of the output module, thereby updating the network convolution kernel value or synaptic weight value.

Optionally, the input module converts the external input signal into the voltage signal required by the convolutional neural network. The pulse width or pulse amplitude of the input signal and the voltage pulse signal follow a proportional relationship. The larger the input signal value, the wider (larger) the pulse width (or pulse amplitude) of the corresponding voltage pulse signal. Otherwise, the narrower (smaller) the corresponding voltage signal, and leads to that the input voltage pulse signal should be lower than the erase voltage of the memristor.

Optionally, the convolutional neural network module adopts the memristor to simulate the convolution kernel value and the synaptic weight value, and the resistance of the memristor is changed as an electrical signal is applied. The convolutional neural network module includes: a convolutional layer circuit module and a pooling layer circuit module, which are composed of memristor array as the convolution kernels, and a fully connected layer circuit module composed by using the memristors as synapses. The convolutional layer circuit module receives the input voltage pulse signal output by the input module, the input voltage pulse signal is processed through the layer-by-layer calculation and conversion performed by the convolutional layer circuit module, the pooling layer circuit module, and the fully connected layer circuit module, and the calculation result is sent to the output module.

Optionally, the convolutional layer circuit module composed by using the memristor array as the convolution kernel is composed of a convolution operation circuit composed of the memristor array and an activation function part. Since there are positive and negative weight values in the biological nerve system, the circuit adopts two rows of memristor array as a convolution kernel to achieve positive and negative convolution kernel values. Meanwhile, in order to obtain all the convolution operation results in one step without the need for an intermediate complex storage layer, when the initial convolution kernel value corresponds to the memristor conductance value, the convolution kernel value is mapped to a matrix capable of performing matrix multiplication operation with the entire input signal. The convolution kernel is expanded into two large sparse matrices K+ and K−. Correspondingly, the characteristic that the memristor is capable of being applied with positive and negative read voltage pulses is utilized to convert the input signal into two one-dimensional matrices with positive input X and negative input −X. The convolution operation circuit performs convolution operation on the input voltage pulse signal and the convolution kernel value stored in the memristor unit, and collects the current of the same column to obtain the convolution operation result. The convolution operation process is y=f((X⊗K+)+(−X⊗K−)+b), wherein ⊗ is the convolution operator, X is the input voltage signal of the front synapse of the neuron node, K+ and K− are respectively the positive and negative convolution kernel values corresponding to the neuron node, so the effective convolution kernel value is (K+)−(K−), and the positive and negative convolution kernel values can be realized; b is the bias term corresponding to the convolutional layer network, and f(.) is the activation function. Then, the output result is transmitted to the pooling layer module. The activation function f(.) mainly includes: sigmoid function, tan h function, ReLU function, ELU function and PReLU function. The activation function activates the convolution operation result and obtains two opposite output values, namely y and −y, and simultaneously converts the two opposite output values y and −y into voltage pulse signals to be used as the input of the pooling layer.

Optionally, the pooling layer circuit module composed by using the memristor array as the convolution kernel is mainly divided into the average pooling operation and the maximum pooling operation, which are composed of a pooling operation circuit composed of the memristor array and a voltage conversion module. The pooling operation is a simpler convolution operation. The convolution kernel value stored in the memristor array remains unchanged during the training process. The circuit structure and the distribution of the convolution kernel mapping are the same as the convolutional layer circuit module, only the stored convolution kernel value is changed. One end of the memristors in the same row are connected together to connect the output of the convolutional layer circuit module, and another end of the memristors in the same column are connected together to connect the voltage conversion module. The voltage conversion module converts the result of the pooling operation circuit into two opposite voltage pulse signals h and −h to serve as the input of the fully connected layer circuit module.

Optionally, the fully connected layer circuit module composed by using the memristor array as synapses realizes the classification function. The fully connected layer circuit module is composed of the fully connected layer circuit composed of the memristor array and the softmax function part. Since the neurons in the fully connected layer and the neurons in the pooling layer are fully connected, the weight mapping methods of the fully connected layer circuit module and the convolutional layer circuit module are different. The fully connected layer circuit is configured to store and calculate the weight matrix, only completes a series of multiplication accumulation operations without shifting the weight matrix. Two memristors are used as a synapse to realize positive and negative weight values. One end of the memristors are connected to the pooling layer circuit unit, and another end of the memristors are connected to the softmax function, the current of the same column is collected to obtain the output result of the layer. The output result is $m_l = \Sigma_i((W_{kl}^+ - W_{kl}^-) * h_k + b_k)$, $$z_l = \frac{e^{m_l}}{\Sigma_j e^{m_j}}.$$

In the equation, $h_k$ is the input voltage pulse signal of front synapse of the kth neuron node, $W_{kl}^+$ and $W_{kl}^-$ are respectively the positive and negative synaptic weight values input by the kth neuron node of the lth neuron node stored in the memristor, and the effective weight value of the synapse is $W_{kl}^+ - W_{kl}^-$, thereby realizing positive and negative synaptic weight values. $b_k$ is the bias term corresponding to the kth neuron node; $m_l$ represents the lth element output through the operation of the fully connected layer circuit; $\Sigma_j e^{m_j}$ is the exponential sum of all output signal elements; $z_l$ is the probability output value corresponding to the signal $m_l$ after being processed through the softmax function. The softmax function realizes $$z_l = \frac{e^{m_i}}{\Sigma_j e^{m_j}},$$

that is, the function of normalizing the values output by the fully connected layer to a probability value, and then the result is transmitted to the output module to obtain the output of the entire convolutional neural network, and the result is sent to the weight update module.

Optionally, the weight update module includes a result comparison module, a calculation module, and a driving module. The result comparison module is connected to the output module and the calculation unit respectively, the result comparison module compares the output result of the current convolutional neural network module with the ideal result, and sends the comparison result to the calculation module. The calculation module is connected to the result comparison module and the driving circuit respectively, the calculation module receives the error signal δ sent from the result comparison module, and calculates the adjustment amount of the network convolution kernel value or weight value according to the determined neural network back-propagation algorithm, and then sends the result to the driving unit. The driving unit includes a pulse generator and a read-write circuit, the driving unit receives the adjustment amount of the convolution kernel value or weight value sent from the calculation unit, and adjusts the conductance of the memristors of the convolutional layer circuit unit and the fully connected layer circuit unit. The pulse generator is configured to generate a modulation signal for adjusting the conductance of the memristor. The read-write circuit is configured to complete the read and write operations on the convolution kernel value or synaptic weight value of the convolutional neural network module based on the memristor.

FIG. 1 is a schematic structural diagram of a convolutional neural network on-chip learning system based on non-volatile memory provided by an embodiment of the disclosure. As shown in FIG. 1, the system includes: an input module, a convolutional neural network module, an output module, and a weight update module.

The input module converts the external input signal into the voltage signal required by the convolutional neural network. The pulse width or pulse amplitude of the input signal and the voltage pulse signal follow a proportional relationship; the larger the input signal value, the wider (larger) the pulse width (or pulse amplitude) of the corresponding voltage pulse signal, otherwise, the narrower (smaller) the corresponding voltage signal, and the voltage signal is transmitted into the convolutional neural network module.

The convolutional neural network module performs a layer-by-layer calculation and conversion on the input voltage pulse signal corresponding to the input signal, and sends the result to the output module to obtain the output of the entire network.

The output module is connected to the convolutional neural network module and the weight update module respectively, and configured to convert and send the output signal generated by the convolutional neural network module to the weight update module.

The weight update module calculates and adjusts the conductance value of the memristor according to the result of the output module, so as to update the network convolution kernel value or synaptic weight value.

Figure 2:
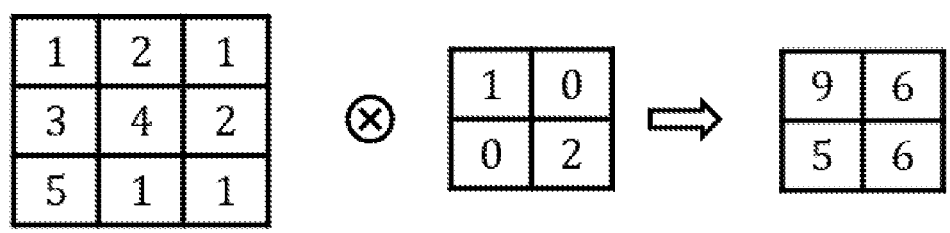
FIG. 2 is a schematic diagram showing the principle of matrix convolution calculation provided by an embodiment of the disclosure.

It should be noted that the convolution operation is the most important and computationally intensive part of the convolutional neural network. As a generalized concept of integration, convolution operation has important applications in image recognition and digital signal processing. Convolution operation is defined as follows. Starting from the upper left corner of the input matrix, open a window in use with the same size as the template (i.e., the convolution kernel). The convolution kernel is typically a square grid structure, and each square in the area has a weight value. First, invert the convolution kernel by 180°. The window matrix and the convolution kernel elements corresponding to each other are multiplied and added together, and the calculation result is used to replace the element in the center of the window. Then, the window in use is moved one column to the right and performs the same calculation. Likewise, the same operation is performed from the left to the right and from the top to the bottom until the matrix is completely overlapped by the convolution kernel to form the new matrix after convolution. When the input matrix is m×m and the size of the convolution kernel matrix is n×n, the corresponding output matrix size is (m−n+1)×(m−n+1). FIG. 2 demonstrates the convolution calculation process of a 3×3 input matrix and a 2×2 convolution kernel to obtain a 2×2 output matrix.

Figure 3:
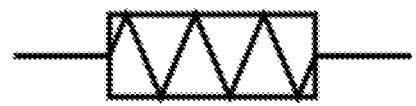
FIG. 3 is a schematic diagram of a memristor unit provided by an embodiment of the disclosure.

FIG. 3 is a schematic diagram of a memristor unit provided by an embodiment of the disclosure. As a non-volatile device, the read-write speed, density, programming voltage and other indexes of the memristor can be comparable to today's leading storage technology, and the energy consumption thereof is relatively low. The simulation of memory function of a memristor is similar to a biological synapse, and its conductance can be continuously changed by applying a relatively large voltage bias, but remains unchanged when a relatively small or no bias is applied. By using different conductance values of the memristor to distinguish between different storage states, the characteristic that the conductance of the memristor is gradually changed under the pulse effect is utilized to simulate the change process of biological synaptic weight, which is similar to the self-adjusting and learning function of the neural network. The type of the memristor can be two-end memristor, three-end memristor or other common types. Moreover, the memristor can be applied with positive and negative read voltage pulses. Such a feature can prevent additional subtraction circuits from being introduced when realizing the positive and negative weight values, thereby reducing the circuit scale to a certain extent.

Figure 4:
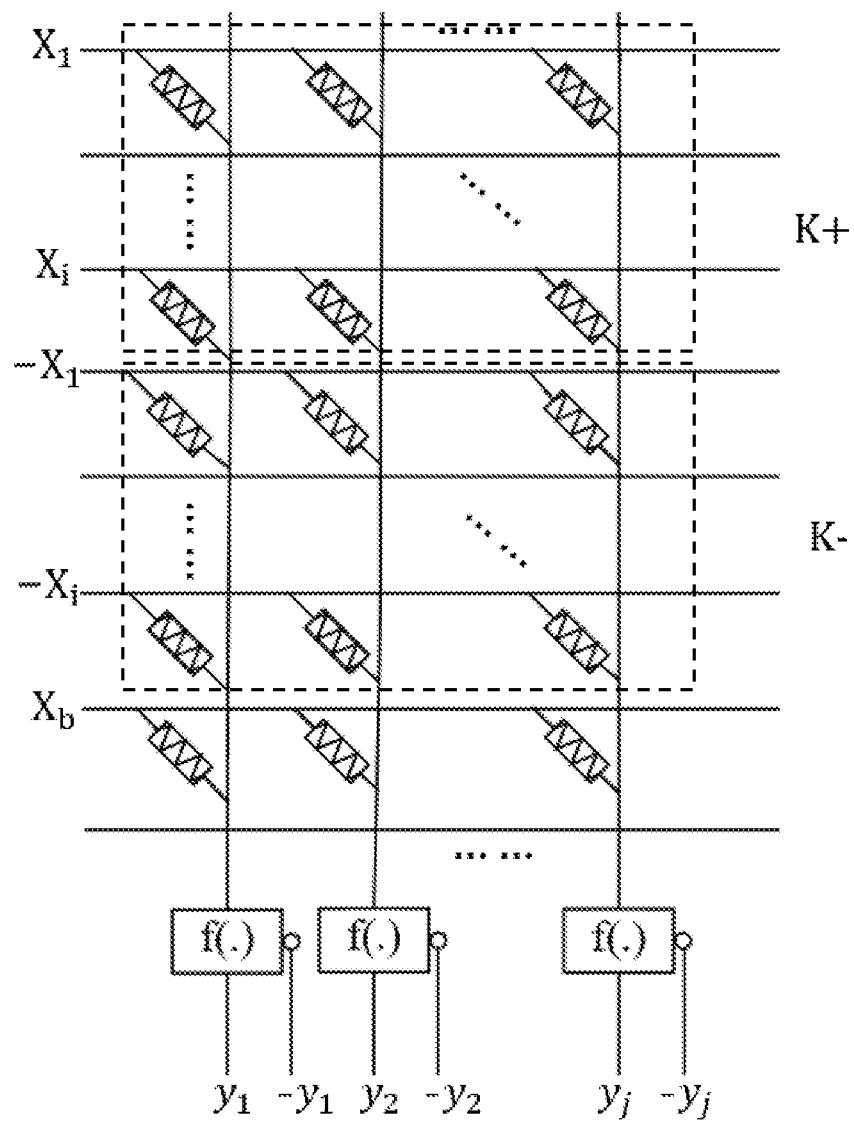
FIG. 4 is a schematic structural diagram of a convolutional layer circuit module composed of the memristor array as the convolution kernel according to an embodiment of the disclosure.

FIG. 4 is a schematic structural diagram of a convolutional layer circuit module composed of the memristor array as the convolution kernel according to an embodiment of the disclosure. The convolutional layer circuit module is composed of a convolution operation circuit composed of the memristor array and an activation function part. The figure shows a convolution operation circuit which adopts the input signal matrix of size $i^{1/2} \times i^{1/2}$, having the convolution kernel with the size of n×n, and having the output matrix with the size of $$j^{\frac{1}{2}} \times j^{\frac{1}{2}} \left( j^{\frac{1}{2}} = i^{\frac{1}{2}} - n + 1 \right).$$

One end of the memristors in the same row are connected together to connect the input module, and another end of the memristors in the same row are connected together to connect the activation function f(.). Since there are positive and negative weight values in the biological nerve system, the circuit adopts two rows of memristor arrays as a convolution kernel to achieve positive and negative convolution kernel values. In the meantime, the convolution kernel is shared in the convolutional layer, it is necessary to use the same convolution kernel to continuously scan the input matrix until all the elements in the input matrix are covered by the convolution kernel matrix, and obtain a series of convolution operation results. In order to obtain all the convolution operation results in one step without the need for a complexed intermediate storage layer, when the initial convolution kernel value corresponds to the memristor conductance value, the convolution kernel value is mapped to a matrix capable of performing matrix multiplication operation with the entire input signal. The convolution kernel is expanded into two large sparse matrices K+ and K−. Correspondingly, the characteristic that the memristor is capable of being applied with positive and negative read voltage pulses is utilized to convert the input signal into two one-dimensional matrices with positive input X and negative input −X. Therefore, the size of the memristor array required is (2×i+1)×j. The convolution operation circuit performs the convolution operation on the input voltage pulse signal and the convolution kernel value stored in the memristor unit, and collects the current in the same column to obtain the convolution operation result. The convolution operation process is y=f((X⊗K+)+(−X⊗K−)+b), wherein y is the result of the convolution operation, ⊗ is the convolution operator, X is the input voltage signal of the front synapse of the neuron node, K+ and K− are respectively the positive and negative convolution kernel values corresponding to the neuron node, so the effective convolution kernel value is (K+)−(K−), and the positive and negative convolution kernel values can be realized; b is the bias term corresponding to the convolutional layer network, and f(.) is the activation function. In FIG. 4, $X_i$ represents the input voltage signal, and $X_b$ represents the input voltage signal of the bias term.

Then, the output result is transmitted to the pooling layer module. The activation function f(.) mainly includes: sigmoid function, tan h function, ReLU function, ELU function and PReLU function. The activation function activates the convolution operation result and obtains two opposite output values, y and −y, and simultaneously converts the two opposite output values y and −y into voltage pulse signals to be used as the input of the pooling layer. In the following, the 2×2 convolution kernel matrix K and the 3×3 input signal matrix X are taken as examples to demonstrate how the convolution kernel is expanded into large sparse matrices K+ and K− and how the input matrix is converted into two one-dimensional matrices which are positive input X and negative input −X.

FIG. 5(a) shows how the convolution kernel matrix K based on the memristor array is converted into matrices K+ and K− by using the proposed method. The convolution kernel is first rotated by 180° and then converted into two matrices. The memristor corresponding to the matrix element which is 0 is in an un-forming state. A high resistance state is constantly maintained during the learning process, so the memristor array can easily explain the positive and negative convolution kernel values. Since the input signal matrix X has 9 elements, there must be 9 rows of convolution kernel matrices K+ and K− each.

FIG. 5(b) shows how the input matrix X is converted into two one-dimensional matrices X and −X, and multiplied by K+ and K−, respectively. Since the size of K is 2×2 and the size of X is 3×3, the size of the output feature is 2×2. Therefore, there must be 4 columns of convolution kernel matrices, and each output value corresponds to one column.

Figure 6:
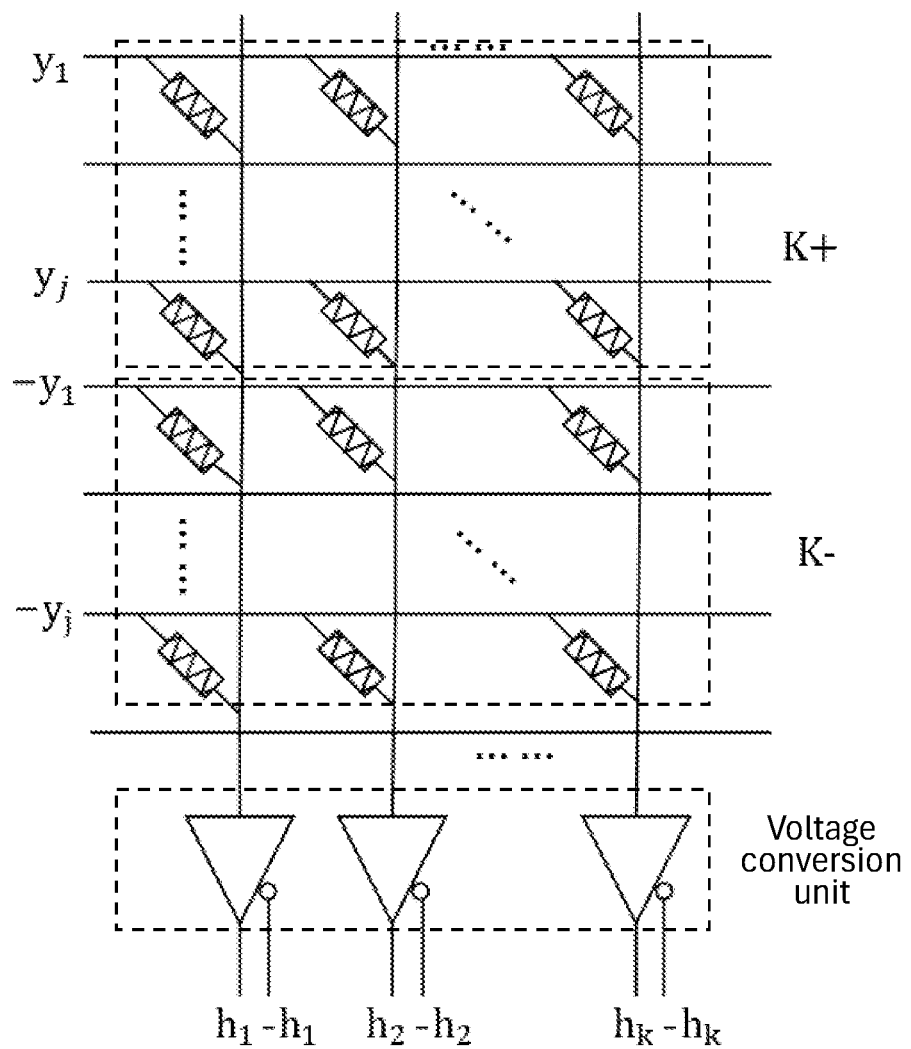
FIG. 6 is a schematic structural diagram of a pooling layer circuit module composed of the memristor array as the convolution kernel according to an embodiment of the disclosure.

FIG. 6 is a schematic structural diagram of a pooling layer circuit module composed by using the memristor array as the convolution kernel according to an embodiment of the disclosure. The pooling layer circuit module is mainly divided into the average pooling operation and the maximum pooling operation. The entire input matrix is separated into several small blocks with the same size in a non-overlapping manner. Only the maximum value or the average value is taken from each small block, and then the other nodes are discarded, and the original planar structure is maintained to obtain the output. The pooling operation can significantly and effectively reduce the size of the matrix, thereby reducing the parameters in the final fully connected layer. In the meantime, using the pooling layer not only can speed up the calculation but also can prevent overfitting. The pooling layer circuit module is connected to the convolutional layer circuit module and the fully connected layer circuit module respectively. The pooling operation is a simpler convolution operation, and the convolution kernel value stored in the memristor array remains unchanged during the training process. Its circuit structure and the distribution of the convolution kernel mapping are the same as the convolutional layer circuit module, only the stored convolution kernel value is changed. One end of the memristors in the same row are connected together to connect the output of the convolutional layer circuit module, and another end of the memristors in the same column are connected together to connect the voltage conversion module. The output terminal of the voltage conversion module is connected to the fully connected layer circuit module. The current in the same column is collected together to achieve the accumulation calculation, and the result of the pooling operation can be obtained by collecting the results at the output terminal of the voltage converter. The voltage conversion module converts the result of the pooling operation circuit into two opposite voltage pulse signals, h and −h, to serve as the input of the fully connected layer circuit module. In this embodiment, a pooling operation with a matrix size of 2×2 is adopted. Since the output matrix of the convolutional layer circuit module is $j^{1/2} \times j_{1/2}$, the output matrix is $$k^{\frac{1}{2}} \times k^{\frac{1}{2}} \left( k^{\frac{1}{2}} = \frac{1}{2} \times j^{\frac{1}{2}} \right),$$

so the memristor array size of the circuit layer circuit module is (2×j+1)×k. After the pooling operation is completed, the result is sent to the fully connected layer circuit module, wherein $h_k$ in FIG. 6 represents the pooling operation result, and y represents the output result of the convolutional layer unit.

Figures 7, 8:
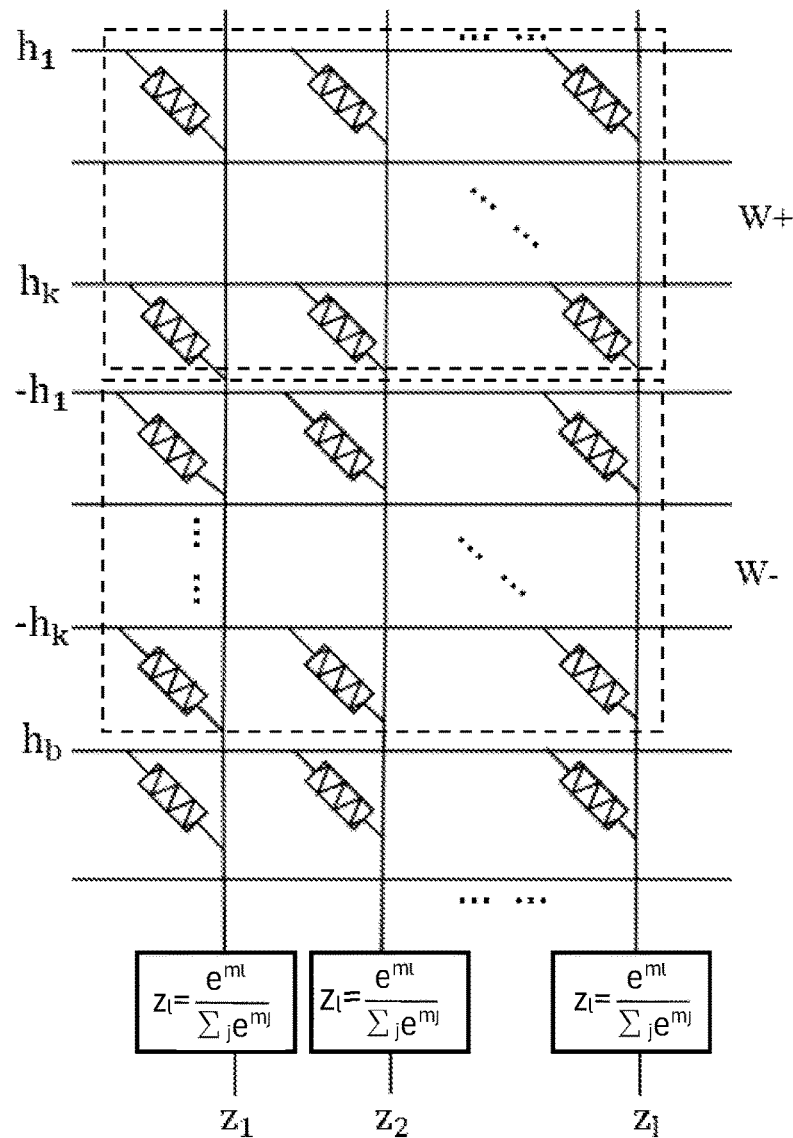
FIG. 7 is a schematic structural diagram of a fully connected layer circuit module composed of the memristors as synapses provided by an embodiment of the disclosure.
FIG. 8 is a schematic diagram of a weight matrix mapping formula provided by an embodiment of the disclosure.

FIG. 7 is a schematic structural diagram of a fully connected layer circuit module composed by using the memristors as synapses provided by an embodiment of the disclosure. The fully connected layer circuit module is connected to the pooling layer circuit module and the output module respectively. The fully connected layer circuit module maps the final output to a linearly separable space, which is to realize the classification function. The fully connected layer circuit module is composed of a fully connected layer circuit composed of the memristor array and a softmax function part. Since the fully connected layer completes a series of simple multiplication accumulation operations in the perceptron network, its neurons and neurons in the pooling layer are fully connected. Therefore, the weight mapping methods of the fully connected layer circuit module and the convolution layer circuit module are different. The fully connected layer circuit is configured to store and calculate the weight matrix, and the convolutional operation circuit is configured to store and calculate a set of convolution kernel arrays. Likewise, two memristors are adopted as a synapse to achieve positive and negative weight values. One end of the memristors in the same row are connected together to connect the output of the pooling layer circuit module, and the another end of the memristors in the same column is connected together to connect the softmax function. The current of the same column is collected to obtain the output result of the layer. The output result is $m_l = E_l((W_{kl}^+ - W_{kl}^-) * h_k + b_k)$, $$z_l = \frac{e^{m_l}}{\Sigma_j e^{m_j}}.$$

In the equation, $h_k$ is the input voltage pulse signal of front synapse of the kth neuron node, $W_{kl}^+$ and $W_{kl}^-$ are respectively the positive and negative synaptic weight values input by the kth input of the lth neuron node stored in the memristor, and the effective weight value of the synapse is $W_{kl}^+ - W_{kl}^-$, thereby realizing positive and negative synaptic weight values. $b_k$ is the bias term corresponding to the kth neuron node; $m_l$ represents the lth element output through the operation of the fully connected layer circuit; $\Sigma_j e^{m_j}$ is the exponential sum of all output signal elements; $z_l$ is the probability output value corresponding to the signal $m_l$ after being processed through the softmax function. The softmax function realizes $$z_l = \frac{e^{m_i}}{\Sigma_j e^{m_j}},$$

that is, the function of normalizing the values output by the fully connected layer to a probability value. Since the size of the output matrix of the pooling layer is $k^{1/2} \times k_{1/2}$, if there are l classifications in the final classification, the size of the memristor array of the fully connected layer circuit in this embodiment is $(2 \times k+1) \times l$. Then the result is transmitted to the output module to obtain the output of the entire network, and the result is sent to the weight update module. In FIG. 7, $h_b$ represents the input signal corresponding to the bias term. In the following, the 3×3 weight matrix is adopted as an example to demonstrate how to map the weight matrix into two matrices W+ and W−.

FIG. 8 shows how to use the proposed method to convert the 3×3 weight matrix W based on the memristor array into two one-dimensional matrices W+ and W−. In the two matrices, the memristor corresponding to the matrix element which is 0 is in an un-forming state. A high resistance state is always maintained during the learning process, so the memristor array can easily explain the positive and negative weight values.

Figure 9:
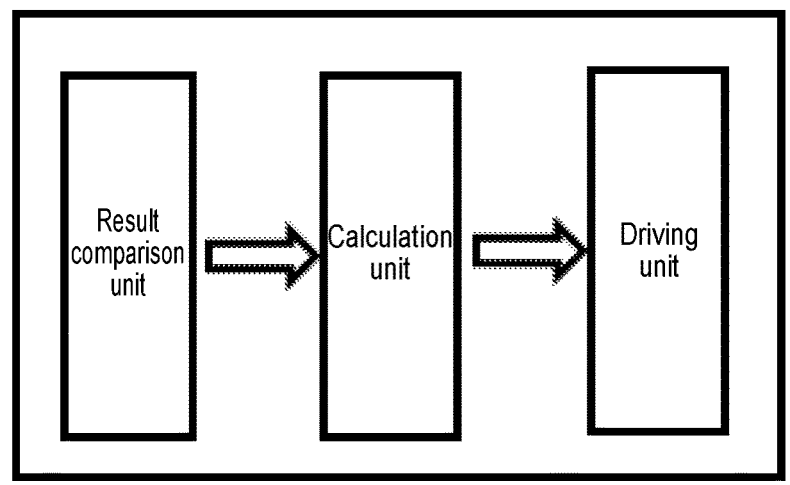
FIG. 9 is a schematic diagram of a weight update module provided by an embodiment of the disclosure.

FIG. 9 is a schematic diagram of a weight update module provided by an embodiment of the disclosure. The weight update module is connected to the output module and the convolutional neural network module respectively, including: a result comparison unit, a calculation unit, and a driving unit. The result comparison unit is connected to the output unit and the calculation unit respectively, the result comparison unit compares the output result of the current convolutional neural network module with an ideal result, and sends the comparison result δ to the calculation unit. The calculation unit is connected to the result comparison unit and the driving unit respectively, the calculation unit receives the error signal δ sent from the result comparison unit, and calculates the adjustment amount Δ of the network convolution kernel value or weight value according to the predetermined neural network backpropagation algorithm, and then sends the result to the driving unit. The driving unit includes a pulse generator and a read-write circuit, the driving unit receives the adjustment amount of the convolution kernel value or weight value sent from the calculation unit, and adjusts the conductance of the memristors of the convolutional layer circuit unit and the fully connected layer circuit unit. The pulse generator is configured to generate a modulation signal for adjusting the conductance of the memristor; the read-write circuit completes the read and write operations on the convolution kernel value or connection weight of the convolutional neural network module based on the memristor. In the following, the operation of the convolutional layer circuit module is taken as an example to demonstrate how the convolution kernel value is updated during the learning process by using the memristor array as a convolution kernel.

Figure 10:
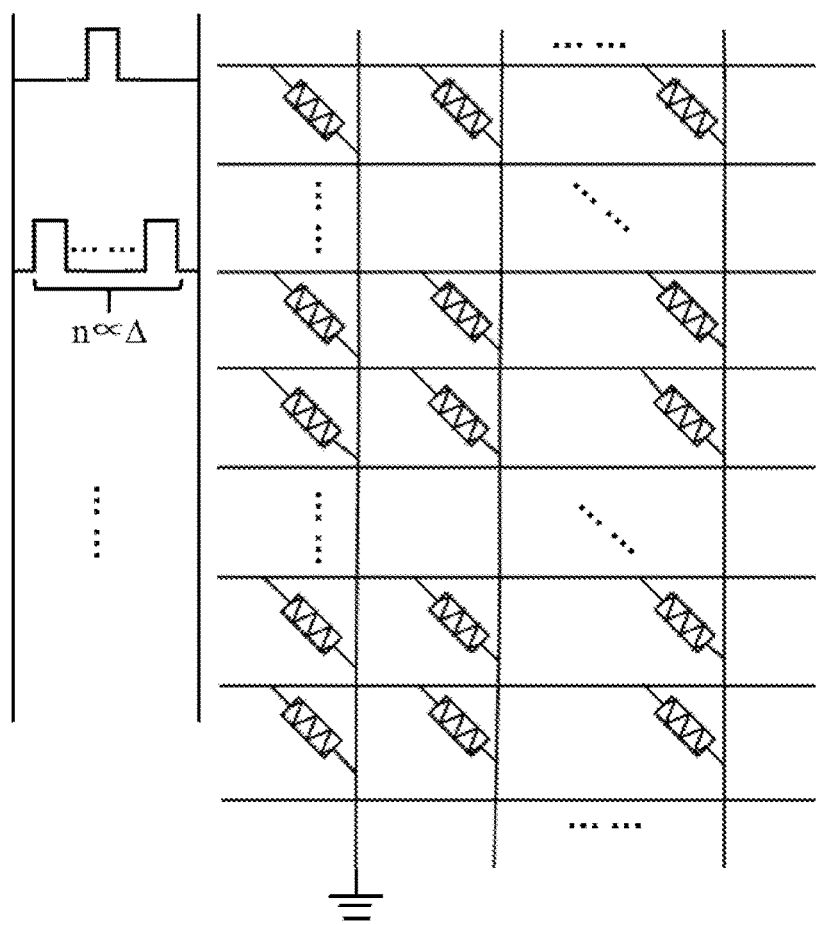
FIG. 10 is a schematic circuit diagram of the operation of the memristor array of the convolutional layer circuit module in the weight update process provided by an embodiment of the disclosure.

FIG. 10 is a schematic circuit diagram of the operation of the memristor array of the convolutional layer circuit module in the weight update process provided by an embodiment of the disclosure. First, select a column in the array to adjust the conductance value of the memristor. The column lines of the memristor in the column are grounded, and the row lines are applied with different conductance adjustment voltage pulse signals. The amplitude of the applied voltage pulse signal is fixed, and the number of pulses is proportional to the adjustment amount Δ of the convolution kernel value or synaptic weight value, thereby updating the convolution kernel value or the synaptic weight value. The same process is applied to other columns, so that the conductance of the entire array of memristors can be adjusted. The update process for weight in the fully connected layer circuit module is similar to the process described above.

Those skilled in the art can easily understand that the above are only preferred embodiments of the disclosure and are not intended to limit the disclosure. Any modification, equivalent replacement and improvement made within the spirit and principle of the disclosure should fall within the scope of the disclosure.

What is claimed is:

1. A convolutional neural network on-chip learning system based on a non-volatile memory, characterized in comprising:
   a central processing unit (CPU), configured to execute an input module, an output module and a weight update module; and
   a memristor array;
   wherein the input module converts an input signal into an input voltage pulse signal required by the memristor array, and then transmits the input voltage pulse signal to the memristor array;
   the memristor array performs a layer-by-layer calculation and conversion on the input voltage pulse signal corresponding to the input signal to complete an on-chip learning to obtain an output signal, the on-chip learning implements a synaptic function by using a conductance modulation characteristic that a conductance of a memristor changes according to an applied pulse, network convolution kernel values or synaptic weight values adopted in the on-chip learning process are stored in the memristor;
   the output module converts and sends an output signal generated by the memristor array to the weight update module;
   the weight update module calculates an error signal and adjusts the conductance value of the memristor according to a result of the output module, so as to update the network convolution kernel values or the synaptic weight values;
   the memristor array adopts the memristor to simulate the network convolution kernel values and the synaptic weight values, and a resistance of the memristor changes according to an applied electrical signal;
   the memristor array comprises a convolution layer circuit unit, a pooling layer circuit unit, and a fully connected layer circuit unit, the convolution layer circuit unit and the pooling layer circuit unit are composed by using the memristor array as convolution kernels, and the fully connected layer circuit unit is composed by using the memristor array as synapses;

the convolutional layer circuit unit receives the input voltage pulse signal output by the input module, and the input voltage pulse signal is processed through the layer-by-layer calculation and conversion performed by the convolutional layer circuit unit, the pooling layer circuit unit, and the fully connected layer circuit unit, and a calculation result is transmitted to the output module as an output signal;

the convolutional layer circuit unit is composed of a convolution operation circuit and an activation function part, the convolution operation circuit is composed of the memristor array;

the convolution operation circuit adopts two rows of memristor arrays as a convolution kernel to realize positive and negative convolution kernel values, when an initial convolution kernel value corresponds to a memristor conductance value, the convolution kernel value is mapped to a matrix capable of performing a matrix multiplication operation with the entire input signal, the convolution kernel is expanded into two large sparse matrices K+ and K−, which are respectively the positive and negative convolution kernel values corresponding to a neuron node, and correspondingly a characteristic that the memristor is capable of being applied with positive and negative read voltage pulses is utilized to convert the input signal into two one-dimensional matrices with positive input X and negative input −X;

the convolution operation circuit performs a convolution operation on the input voltage pulse signal and the convolution kernel value stored in a memristor unit, and collects currents of the same column to obtain a convolution operation result; the convolution operation process is y=f((X⊗K+)+(−X⊗K−)+b), wherein y is a result of the convolution operation, ⊗ is a convolution operator, X is an input voltage signal of a front synapse of the neuron node, K+ and K− are respectively the positive and negative convolution kernel values corresponding to the neuron node, b is a bias term corresponding to a convolutional layer network, and f(.) is the activation function;

the convolutional layer circuit unit transmits the convolution operation result to the pooling layer circuit unit; and the activation function activates the convolution operation result and obtains two opposite output values, y and −y, and simultaneously converts the two opposite output values y and −v into a voltage pulse signal to serve as an input of the pooling layer circuit unit.

2. The convolutional neural network on-chip learning system based on the non-volatile memory according to claim 1, characterized in that the input module converts an external input signal into the input voltage pulse signal required by the convolutional neural network, a pulse width or a pulse amplitude of the input signal, and the input voltage pulse signal follows a proportional relationship, and the input voltage pulse signal is less than an erase voltage of the memristor.

3. The convolutional neural network on-chip learning system based on the non-volatile memory according to claim 1, characterized in that the pooling layer circuit unit is divided into an average pooling operation and a maximum pooling operation, which are composed of a pooling operation circuit composed of the memristor array and a voltage conversion sub-unit;

the network convolution kernel values stored in the memristor array corresponding to the pooling operation circuit remains unchanged during a training process, circuit structure of the pooling operation circuit and mapping distribution of the convolution kernel are the same as the convolutional layer circuit unit, only the stored convolution kernel value is changed; and the voltage conversion sub-unit converts a result of the pooling operation circuit into two opposite voltage pulse signals, h and −h, so as to serve as an input of the fully connected layer circuit unit.

4. The convolutional neural network on-chip learning system based on the non-volatile memory according to claim 1, characterized in that the fully connected layer circuit unit realizes a classification function, and is composed of the fully connected layer circuit composed of the memristor array and a softmax function part, weight mapping methods of the fully connected layer circuit unit and the convolutional layer circuit unit are different;

the fully connected layer circuit is configured to store and calculate a weight matrix, only completes a series of multiplication accumulation operations without shifting the weight matrix, two memristors are utilized as a synapse to realize positive and negative weight values, one end of the memristor is connected to the pooling layer circuit unit, and another end of the memristor is connected to the softmax function, the current of the same column is collected to obtain an output result of the layer, the output result is $m_l = \Sigma_l((W_{kl}^+ - W_{kl}^-)*h_k + b_k)$, $$z_l = \frac{e^{m_l}}{\Sigma_j e^{m_j}},$$

in the equation, $h_k$ in an input voltage pulse signal of a front synapse of the kth neuron node, $W_{kl}^+$ and $W_{kl}^-$ are respectively the positive and negative synaptic weight values of the kth input of the lth neuron node stored in the memristor, and an effective weight value of the synapse is $W_{kl}^+ - W_{kl}^-$, thereby realizing positive and negative synaptic weight values, $b_k$ is a bias term corresponding to the kth neuron node; $m_l$ represents an lth element output through the operation of the fully connected layer circuit; $\Sigma_j e^{m_j}$ is an exponential sum of all output signal elements; $z_l$ is a probability output value corresponding to the signal $m_l$ after being processed through the softmax function; and the softmax function realizes $$z_l = \frac{e^{m_l}}{\Sigma_j e^{m_j}},$$

that is, the function of normalizing the values output by the fully connected layer to a probability value, and then the result is transmitted to the output module to obtain an output of an entire convolutional neural network, and the result is sent to the weight update module.

5. The convolutional neural network on-chip learning system based on the non-volatile memory according to claim 1, characterized in that the weight update module comprises a result comparison unit, a calculation unit, and a driving unit;

the result comparison unit is connected to the output module and the calculation unit respectively, the result comparison unit compares an output result of the current memristor array with a preset result, and sends a comparison result to the calculation unit; and the calculation unit is connected to the result comparison unit and the driving unit respectively, the calculation unit receives the error signal o sent from the result comparison unit, and calculates an adjustment amount of the network convolution kernel values or the weight value according to a determined neural network back-propagation algorithm, and then sends a result to the driving unit, the driving unit comprises a pulse generator and a read-write circuit, the driving unit receives the adjustment amount of the convolution kernel value or the weight value sent from the calculation unit, and adjusts a conductance of the memristors of the convolutional layer circuit unit and the fully connected layer circuit unit; the pulse generator is configured to generate a modulation signal for adjusting the conductance of the memristor; the read-write circuit completes read and write operations on the convolution kernel value or the synaptic weight values of the memristor array based on the memristor.

* * * * *